US012548747B2

(12) United States Patent
Kovarik et al.

(10) Patent No.: US 12,548,747 B2
(45) Date of Patent: Feb. 10, 2026

(54) BUBBLE BASED SAMPLE ISOLATION IN A TRANSPORT LIQUID

(71) Applicant: DH Technologies Development Pte. Ltd., Singapore (SG)

(72) Inventors: Peter Kovarik, Markham (CA); Bradley B. Schneider, Bradford (CA); Thomas R. Covey, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 325 days.

(21) Appl. No.: 18/550,016

(22) PCT Filed: Mar. 22, 2022

(86) PCT No.: PCT/IB2022/052623

§ 371 (c)(1),
(2) Date: Sep. 11, 2023

(87) PCT Pub. No.: WO2022/201037

PCT Pub. Date: Sep. 29, 2022

(65) Prior Publication Data

US 2024/0170270 A1 May 23, 2024

Related U.S. Application Data

(60) Provisional application No. 63/164,883, filed on Mar. 23, 2021.

(51) Int. Cl.
*H01J 49/04* (2006.01)
*H01J 49/16* (2006.01)

(52) U.S. Cl.
CPC ...... *H01J 49/0404* (2013.01); *H01J 49/0431* (2013.01); *H01J 49/165* (2013.01)

(58) Field of Classification Search
CPC ... H01J 49/0404; H01J 49/0431; H01J 49/165
(Continued)

(56) References Cited

U.S. PATENT DOCUMENTS 5,109,840 A 5/1992 Daleiden
5,691,205 A 11/1997 Kawabata et al.
(Continued)

FOREIGN PATENT DOCUMENTS

EP 0421007 4/1991
EP 2443432 4/2012
(Continued)

OTHER PUBLICATIONS

Anonymous, “Turbo V Ion Source Operator Guide”, AB Sciex Pte, Ltd., Aug. 1, 2015, retrieved from the internet on Mar. 17, 2022 at: https://manualzz.com/doc/7476753/user-guide--turbo-v-ion-source-operator-guide, “TurboIonSpray Probe Optimization”, and “Adjust the Electrode Tip Extension”, 52 pages.
(Continued)

*Primary Examiner* — Michael Maskell
(74) *Attorney, Agent, or Firm* — Merchant & Gould P.C.

(57) ABSTRACT

A method of evacuating a liquid sample from an open port interface (OPI) via a pressure drop includes applying the pressure drop to a transport liquid. This application generates a plurality of bubbles in the transport liquid during evacuation of the transport liquid from the OPI via a transfer conduit. The liquid sample is separated from a subsequent liquid sample by at least one of the generated bubbles.

20 Claims, 12 Drawing Sheets

(58) Field of Classification Search
USPC .......................................... 250/281, 282, 288
See application file for complete search history.

(56) References Cited

U.S. PATENT DOCUMENTS

| | | | |
|---|---|---|---|
| 7,923,681 | B2 | 4/2011 | Collings et al. |
| 10,770,277 | B2 | 9/2020 | Datwani et al. |
| 11,232,938 | B2 | 1/2022 | Arnold et al. |
| 2003/0193020 | A1 | 10/2003 | Van Berkel |
| 2004/0102742 | A1 | 5/2004 | Tuyl |
| 2013/0092166 | A1 | 4/2013 | Pearce |
| 2013/0118498 | A1 | 5/2013 | Robitaille et al. |
| 2013/0294971 | A1 | 11/2013 | Van Berkel et al. |
| 2014/0216177 | A1 | 8/2014 | Van Berkel et al. |
| 2014/0283627 | A1 | 9/2014 | Hattingh et al. |
| 2016/0266017 | A1* | 9/2016 | Kennedy .............. B01D 15/424 |
| 2017/0316926 | A1 | 11/2017 | Arnold et al. |
| 2018/0021533 | A1 | 1/2018 | Gausche-Hill et al. |
| 2019/0157061 | A1 | 5/2019 | Datwani et al. |
| 2020/0345968 | A1 | 11/2020 | Merrell et al. |
| 2020/0365382 | A1* | 11/2020 | Arnold ..................... G01N 1/14 |
| 2021/0121905 | A1 | 4/2021 | Covey |
| 2023/0349858 | A1 | 11/2023 | Covey |
| 2024/0079225 | A1 | 3/2024 | Covey |
| 2024/0096611 | A1 | 3/2024 | Covey |
| 2024/0112901 | A1 | 4/2024 | Liu |
| 2024/0159716 | A1 | 5/2024 | Cox |
| 2024/0170271 | A1* | 5/2024 | Kovarik ................ H01J 49/145 |
| 2024/0175787 | A1 | 5/2024 | Tate |
| 2024/0272191 | A1 | 8/2024 | Verma |

FOREIGN PATENT DOCUMENTS

| | | |
|---|---|---|
| WO | 2010/048339 | 12/2010 |
| WO | 2011/146269 | 11/2011 |
| WO | 2012/149314 | 11/2012 |
| WO | 2013/112914 | 8/2013 |
| WO | 2014/140776 | 9/2014 |
| WO | 2015/108807 | 7/2015 |
| WO | 2015/188282 | 12/2015 |
| WO | 2018/217778 | 11/2018 |
| WO | 2019/102350 | 5/2019 |
| WO | 2019/126363 | 6/2019 |
| WO | 2020/016809 | 1/2020 |
| WO | 2020/079647 | 4/2020 |
| WO | 2021/234644 | 11/2021 |
| WO | 2022/172199 | 8/2022 |
| WO | 2022/201037 | 9/2022 |
| WO | 2022/208393 | 10/2022 |

OTHER PUBLICATIONS

Bonvin, Gregoire et al., "Capillary electrophoresis; electrospray ionization-mass spectrometry interfaces: Fundamental concepts and technical developments", Journal of Chromatopgraphy A, vol. 1267, Dec. 1, 2012, pp. 17-31.

Dirico, Kenneth et al., "Ultra-High-Throughput Acoustic Droplet Ejection-Open Port Interface-Mass Spectrometry for Parallel Medicinal Chemistry", ACS Medicinal Chemistry Letters, vol. 11, No. 6, May 1, 2020, pp. 1101-1110.

Hager, James et al., "Product ion scanning using Q-q-Q linear ion trap (Q TRAP) mass spectrometer", Rapid Communications in Mass Spectrometry, 2003; 17: 1056-1064.

Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.

Maxwell, E. Jane et al., "Decoupling CE and ESI for a more robust interface with MS", Electrophoresis, Verlag- Chemie, Hoboken, USA, vol. 31, No. 7, Mar. 1, 2010, pp. 1130-1137.

PCT International Preliminary Report on Patentability in Application PCT/IB2022/052623, mailed Oct. 5, 2023, 8 pages.

PCT International Search Report and Written Opinion in Application PCT/IB2022/052623, mailed Jun. 15, 2022, 23 pages.

Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.

Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.

Sciex, Echo MS Core Module User Guide, published by SCIEX, RUO-IDV-05-9945-C, Apr. 2020, 51 pages.

Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.

Tascon, Marcos et al., "Development of a microfluidic open interface with flow isolated desorption volume for the direct coupling of SPME devices to mass spectrometry", Analytical Chemistry, vol. 90, No. 4, Feb. 1, 2018, pp. 2631-2638.

Van Berkel et al., Immediate drop on demand technology (I-DOT) coupled with mass spectrometry via an open-port sampling interface, Bioanalysis, vol. 9, No. 21, Nov. 2, 2017, pp. 1667-1679.

Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.

Van Berkel, Gary et al., "Combined Falling Drop/Open Port Sampling Interface System for Automated Flow Injection Mass Spectrometry", Analytic Chemistry, 2017, 89, 22, pp. 12578-12586.

Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.

Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.

Zhang, Hui et al., "Acoustic Ejection Mass Spectrometry for High-Throughput Analysis", Analytical Chemistry, Jan. 29, 2020, 12 pages.

* cited by examiner

BUBBLE BASED SAMPLE ISOLATION IN A TRANSPORT LIQUID

CROSS-REFERENCE TO RELATED APPLICATION

This application is a National Stage Application of PCT/IB2022/052623, filed on Mar. 22, 2022, which claims the benefit of U.S. Provisional Patent Application No. 63/164,883, filed on Mar. 23, 2021, the entire disclosures of which are incorporated herein by reference in their entireties. To the extent appropriate, a claim of priority is made to each of the above disclosed applications.

BACKGROUND

High-throughput sample analysis is critical to the drug discovery process. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been improved to provide higher throughput. Acoustic droplet ejection (ADE) has been combined with an open port interface (OPI) to provide a sample introduction system for high-throughput mass spectrometry. When an ADE device and OPI are coupled to a mass spectrometer, the system can be referred to as an acoustic ejection mass spectrometry (AEMS) system. The analytical performance (sensitivity, reproducibility, throughput, etc.) of an AEMS system depends on the performance of the ADE device and the OPI. The performance of the ADE device and the OPI depends on selecting the operational conditions or parameters for these devices. AEMS technology brings fast, precisely controlled, low-volume sampling to the electrospray ionization (ESI) transport liquid without carry-over, to enable a high-throughput analytical platform with good reproducibility, and wide compound coverage.

SUMMARY

In one aspect, the technology relates to a method of separating samples received in an open port interface (OPI), the method including: delivering a transport liquid to the OPI at a first flow rate, wherein the OPI is disposed in an atmosphere; aspirating the transport liquid from the OPI via a transfer conduit at a first pressure, so as to introduce a plurality of first bubbles into the transport fluid, wherein the plurality of first bubbles are introduced from the atmosphere and into the transfer conduit, wherein the plurality of first bubbles are generated at a first frequency; introducing a sample from a sample holder into the OPI, wherein the introduction of the sample terminates the generation of the plurality of first bubbles; and aspirating the sample and the transport liquid from the OPI via the transfer conduit at the first pressure, wherein the sample and at least a portion of the transport liquid are bounded on a leading end by one of the plurality of first bubbles and on a trailing end by one of a plurality of second bubbles. In an example, the method further includes, subsequent to aspirating the sample and the transport liquid from the OPI, aspirating the transport liquid from the OPI via the transfer conduit at the first pressure, so as to introduce the plurality of second bubbles into the transport fluid, wherein the plurality of second bubbles are introduced from the atmosphere and into the transfer conduit, wherein the plurality of second bubbles are generated at a second frequency. In another example, the second frequency is equal to the first frequency. In yet another example, the first flow rate includes a range of about 10 uL/min to about 5 mL/min. In still another example, the first pressure includes a range of about 0.1 psi to about 14.7 psi.

In another example of the above aspect, the first frequency includes a range of about 0.1 Hz to about 10 kHz. In an example, delivering the transport liquid to the OPI at the first flow rate, aspirating the transport liquid from the OPI via the transfer conduit at the first pressure, and introducing the sample from the sample holder into the OPI are performed substantially simultaneously. In another example, delivering the transport liquid to the OPI at the first flow rate, introducing the sample from the sample holder into the OPI, and aspirating the sample and the transport liquid from the OPI via the transfer conduit at the first pressure are performed substantially simultaneously. In yet another example, the sample includes a plurality of sub-samples.

In another aspect, the technology relates to a method of evacuating a liquid sample from an open port interface (OPI) with a pressure drop, the method includes applying the pressure drop to a transport liquid to generate a plurality of bubbles in the transport liquid during evacuation of the transport liquid from the OPI via a transfer conduit, wherein the liquid sample is separated from a subsequent liquid sample by at least one bubble. In an example, the method further includes generating the pressure drop by ejecting at least one of the transport liquid and the sample from an electrospray ionization (ESI) electrode disposed at an opposite end of the transfer conduit from the OPI. In another example, the method further includes delivering to the OPI the transport liquid during application of the pressure drop. In yet another example, applying the pressure drop to the transport liquid generates a flow rate of transport liquid through the transfer conduit corresponding to about 50% to about 90% of a flow rate based on the Hagen-Poiseuille equation. In still another example, applying the pressure drop to the transport liquid generates a flow rate of transport liquid through the transfer conduit of no less than about 50% of a flow rate based on the Hagen-Poiseuille equation.

In another example of the above aspect, applying the pressure drop to the transport liquid generates a flow rate of transport liquid through the transfer conduit of no greater than about 90% of a flow rate based on the Hagen-Poiseuille equation. In an example, the ESI electrode includes a nebulizer-assisted ESI electrode, and the pressure drop is generated by a nebulizer gas expanding past an opposite end of the transfer conduit. In another example, the liquid sample includes a first portion on a first side of a first bubble of the plurality of bubbles and a second portion on a second side of the plurality of bubbles.

In another aspect, the technology relates to a method of separating samples received in an open port interface (OPI), the method including: delivering a transport liquid to the OPI at a first flow rate, wherein the OPI is disposed in an atmosphere; aspirating the transport liquid from the OPI via a transfer conduit at a first pressure, so as to generate a plurality of bubbles in the transport fluid, wherein the plurality of bubbles are introduced from the atmosphere and into the transfer conduit, wherein the plurality of bubbles are generated at a first frequency; introducing a first sample from a sample holder into the OPI; and aspirating the first sample and the transport liquid from the OPI via the transfer conduit at the first pressure, wherein the first sample and at least a portion of the transport liquid form a first aliquot bounded on a leading end by a first one of the plurality of bubbles and on a trailing end by a second one of the plurality of bubbles. In an example, the method further includes introducing a second sample from the sample holder into the OPI; and aspirating the second sample and the transport liquid from the OPI via the transfer conduit at the first pressure, wherein the second sample and at least a portion of the transport liquid form a second aliquot bounded on a leading end by the second one of the plurality of bubbles and on a trailing end by a third one of the plurality of bubbles. In another example, each bubble of the plurality of bubbles are separated at a uniform frequency.

DETAILED DESCRIPTION

Figure 1:
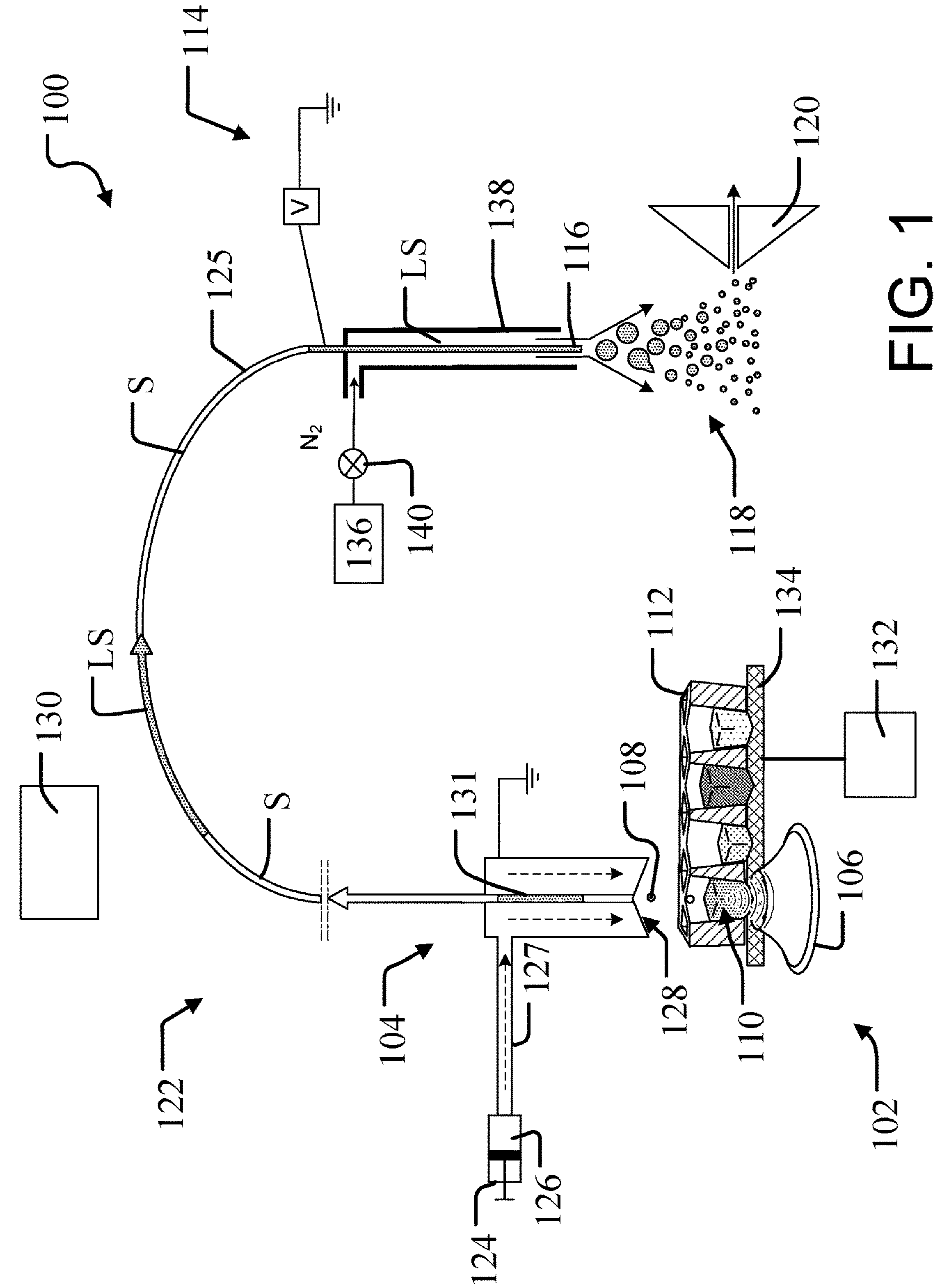
FIG. 1 is a schematic view of an example system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are in the gas phase. A liquid handling system 122 (e.g., including one or more pumps 124 and one or more transfer conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the port inlet 128 at the sample tip and subsequently delivered to the ESI source 114, by being drawn first into a sample removal conduit 131 within the OPI 104.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to the ADE 102 and can be configured to operate any aspect of the ADE 102 (e.g., focusing structures, acoustic ejector 106, automation elements 132 for moving a movable stage 134 so as to position a reservoir 110 into alignment with the acoustic ejector 106, etc.). This enables the ADE 106 to inject droplets 108 into the sampling OPI 104 as otherwise discussed herein substantially continuously or for selected portions of an experimental protocol by way of non-limiting example. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include discrete volumes of liquid samples LS received from each reservoir 110 of the well plate 112. The discrete volumes of liquid samples LS are typically separated from each other by volumes of the solvent S (hence, as flow of the solvent moves the liquid samples LS from the OPI 104 to the ESI source 114, the solvent may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference under high-field and low-field conditions. Additionally, it will be appreciated that the mass analyzer detector 120 can comprise a detector that can detect the ions that pass through the analyzer detector 120 and can, for example, supply a signal indicative of the number of ions per second that are detected.

The sample droplets 108 ejected from the well plate 112 are aspirated along with the transport liquid to the ESI. In examples where the flow of transport fluid is uninterrupted from the inlet of the sample removal conduit to the ESI, the flow is referred to as "closed flow" and is analytically described by the Hagen-Poiseuille (H-P) equation. Introduction of the droplet 108 of the liquid sample into the transport liquid stream leads to dilution of the sample, which may be referred to as an aliquot. At the detector 120, this results in broadening of the detected peaks. The plug length of the aliquot lengthens as it travels with the transport liquid through the transport conduit 125, which in examples may be PEEK tubing. Laminar flow through the circular transport conduit 125 results in a parabolic velocity profile within the transport liquid. The liquid close to the conduit walls is thus slowed down by the wall friction, while the liquid flow along the central axis of the transport conduit 125 is less impeded. In examples, this may result in a core flow that is about twice the average flow velocity (which represents the bulk flow speed of the aliquot). The velocity magnitude changes radially from the central portion of the transport conduit 125 towards the wall.

As aliquot travels along the transport conduit 125 in a closed flow condition, the aliquot plug becomes elongated. For illustrative purposes, an approximation is that the stretch extent results in the aliquot plug extending the entire length of its travelled distance. The detected peak maximum can be taken as the transport at the "bulk" (e.g., average) velocity. Since the fastest component of the aliquot travels at twice that speed, the leading edge of the peak will be twice as far, causing the resulting detected peak to widen. If it is assumed for illustrative purposes that the peak is symmetrical, the leading edge separation from the peak maximum would be duplicated on the trailing side of the peak. This would translate to the distance the average speed covered during that time. Such a simplified representation gives a quantitative scale to the aliquot plug spread due to the parabolic flow velocity encountered during its transport. In certain examples, a parabolic velocity profile is expected to be fully developed in the first 0.4 mm downstream from the sample removal conduit 131 entrance.

The technologies described herein deliberately introduce gas bubbles from the environment in which the OPI is disposed into the transport liquid flow. Each bubble spans the entire cross section (cross section containing the diameter of the conduit) of the flow, forming a break in the liquid column. A liquid stream containing bubbles does not develop the parabolic velocity profile typical of closed flow, since each bubble acts to average the speed across the radius of the transport conduit. The phase change and associated surface tension acts to absorb the energy of the central portion of the flow stream, resulting in a much more "irrotational flow" where the velocity across the radius is equal. The absence of parabolic velocity profile prevents the aliquot from elongating and limits its spread. Generation of the bubbles may be a function of a number of factors, including the structure through which the sample is aspirated (e.g., the diameter of the sample removal conduit, the diameter of the transfer conduit, diameter of OPI port, OPI depth, geometry of the OPI in general and its material properties related to "wetting" by the transport liquid and/or sample), viscosity of the transport liquid and/or sample, aspiration pressure drop to remove the sample and transport liquid, flow rate of the transport liquid into the OPI, and, in some examples, length of the transport conduit. The sample removal conduit diameter may be sized from about 0.01 mm to about 1 mm. The OPI port diameter may be sized from about 0.1 mm to about 5 mm; the separation distance between the OPI port and the sample removal conduit may be about 0.05 mm to about 5 mm. At the desired conditions, bubbles are generated at even intervals within the transport conduit. In examples, introduction of the sample droplet temporarily terminates generation of the bubbles, as the sample is aspirated into the sample removal conduit of the OPI and onward into the transfer conduit. Once the sample clears the inlet of the sample removal conduit, bubble generation resumes. Thus, the aspirated samples may be clearly separated from each other by one or more bubbles. In another example, the sample droplets may be sized so as to not interrupt the bubble generation, so as to easily be contained within a bolus of transport liquid between adjacent, regularly generated bubbles.

During sample introduction into a gas/liquid interface formed at the inlet to the OPI, the incoming sample droplet may alter how the transport liquid exits the OPI. This may happen through one or more of momentum transfer, energy transfer (such as surface tension energy interaction), or by disturbing the inlet and/or outlet volume flow balance. As an example, a 5 nL droplet arriving inside the port in 1 to 2 msec, will monetarily increase the inflow into the sample removal conduit from 400 μL/min (6.6 μL/sec) to 600 μL/min (10.0 μL/sec), thus changing the flow mode from bubble forming air ingest to a closed (balanced) flow. This is a fast-transient state, that in examples lasts about 50 msec, and the port returns to steady state flow where the excess energy provided to the transport flow by the nebulizer nozzle is balanced by surface tension associated with air ingest and bubble formation.

Figure 2A:
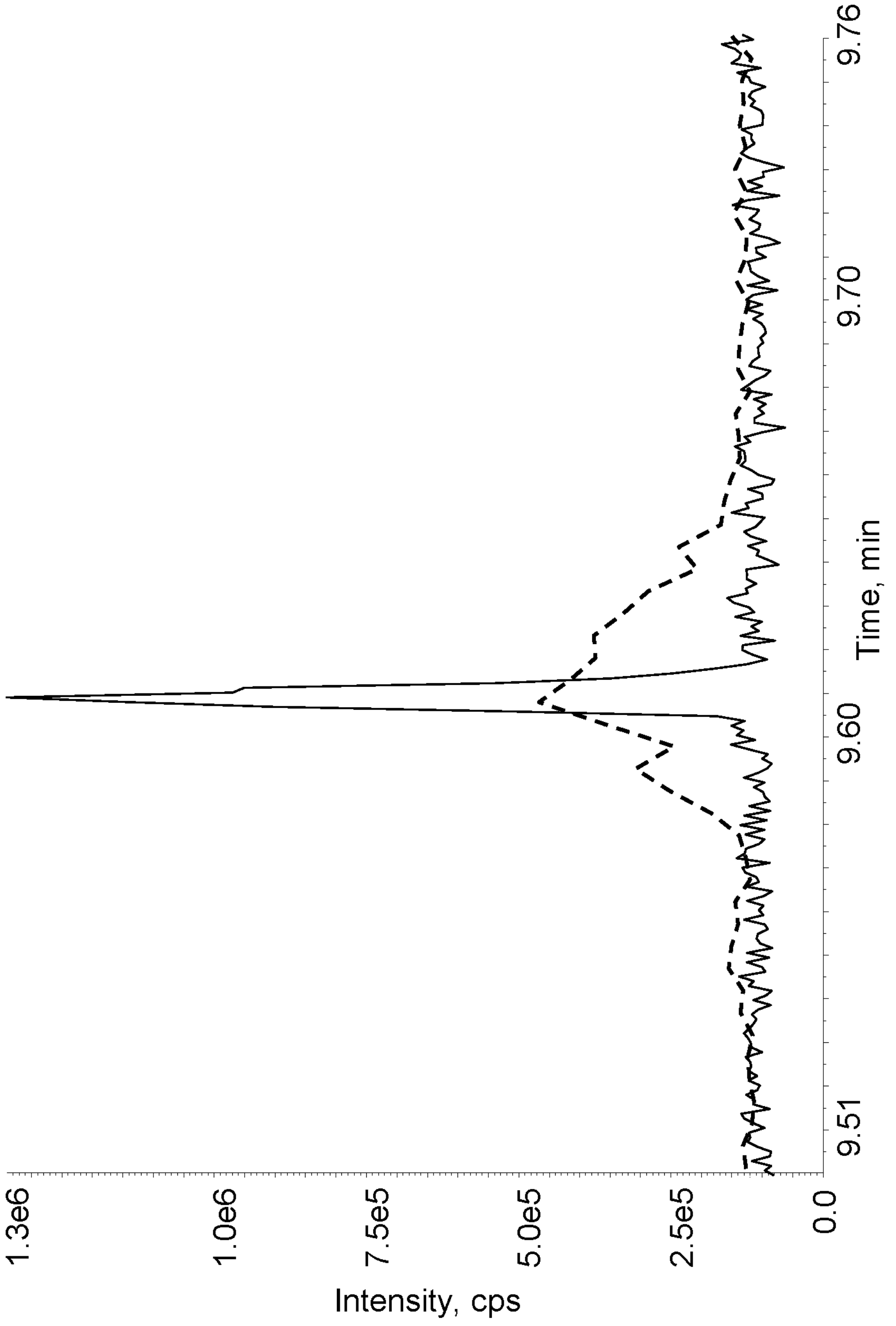
FIGS. 2A-2B depict example plots of peak signals for transport liquids displaying a closed flow condition and a bubble flow condition.
Figure 2B:
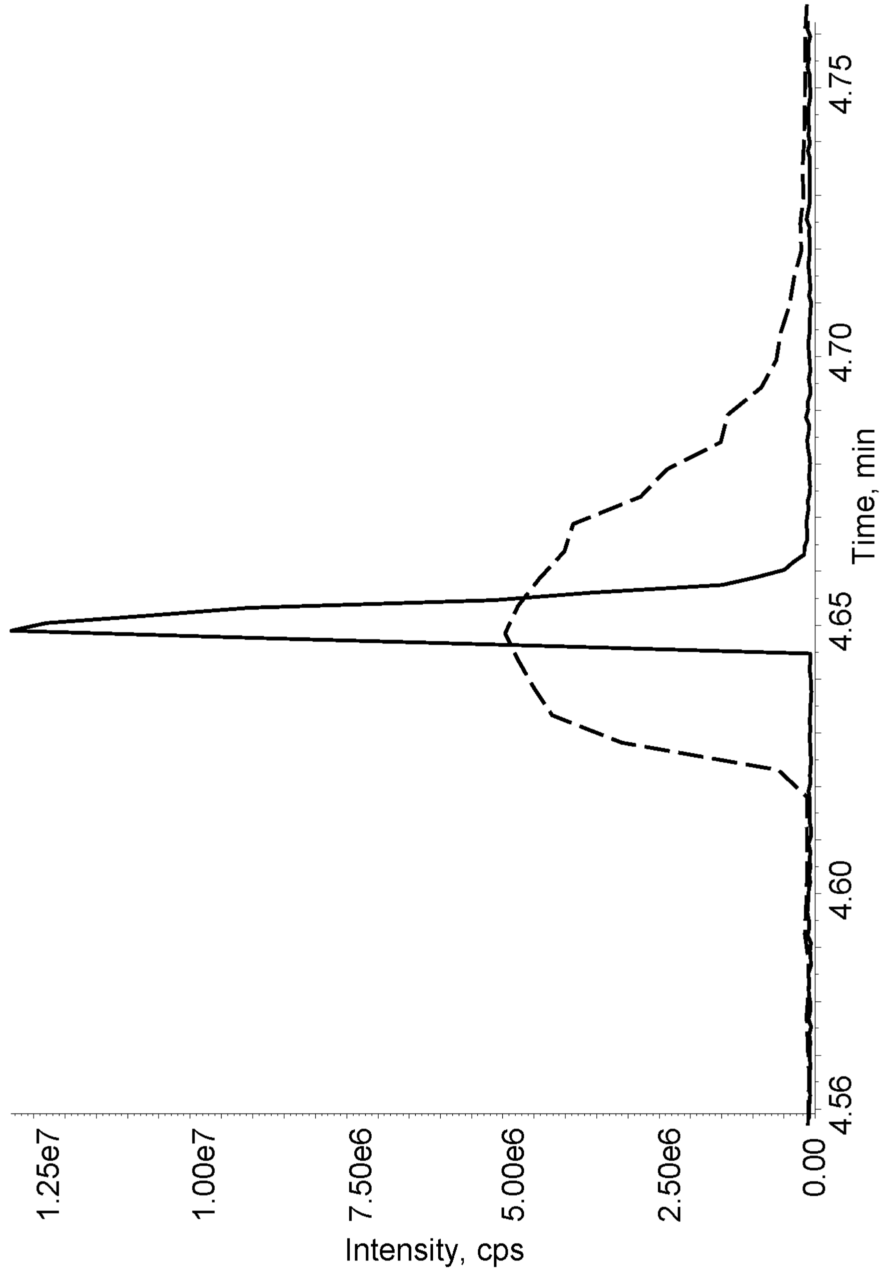

Example peaks detected at a detector for samples introduced into a transport liquid closed flow or a flow where bubbles are present are depicted in FIGS. 2A and 2B. An advantage of generating bubbles in the transport liquid is apparent in both FIGS. 2A and 2B, which depict flow injection analysis (FIA) style peaks and OPI generated peaks. Compare a peak generated by a droplet introduced by VICI injector into a closed flow, as shown in the dashed lines, with that of a peak generated by the same volume sample droplet introduced into a transport liquid stream containing bubbles, as shown in the solid lines. The flow-rates in all examples are equal, and the peak width reduction due to the transport fluid with bubbles present therein is evident. The flowrate for both figures is 420 μL/min, the sample is DEET, and the concentration is 1 ng/μL in FIG. 2A, while the concentration is 10 ng/μL in FIG. 2B.

Figure 2C:
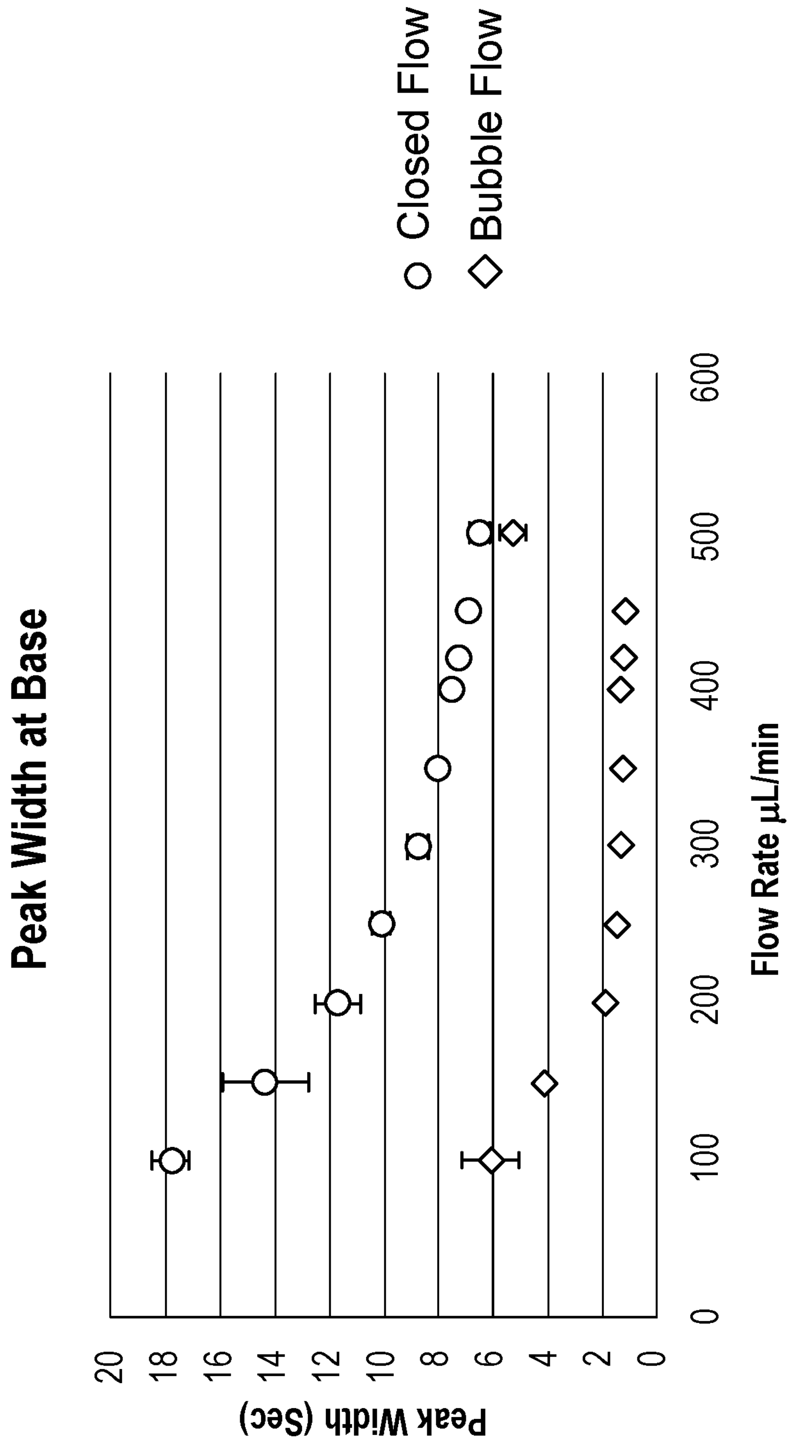
FIG. 2C depicts a comparative plot of peak widths for closed flow and bubble flow conditions, across a plurality of flow rates.

FIG. 2C depicts a comparative plot of peak widths for closed flow and bubble flow conditions, across a plurality of flow rates. Peak width difference between the conventional (FIA) sample delivery and bubble isolated transport is approximately 8-9× improvement in peak width, as depicted in the difference between the two plots. The reduced peak width translates directly to throughput improvement. As the flow rate is being increased, the bubble flow point at about 500 μL/min represents a flow where the OPI port enters the closed flow (flow described by the H-P equation). There, the transfer conduit is no longer over pumped and no bubbles are generated as liquid completely fills the conduit, and all energy supplied by the nozzle is used to move the liquid. No energy remains to form bubbles and hence it is a confirmation of the "bubble" process as when no bubbles are aspirated the peak width returns to that generated by FIA closed flow. Systems and methods for generating bubbles within the transport liquid flow are now described below.

Figure 3:
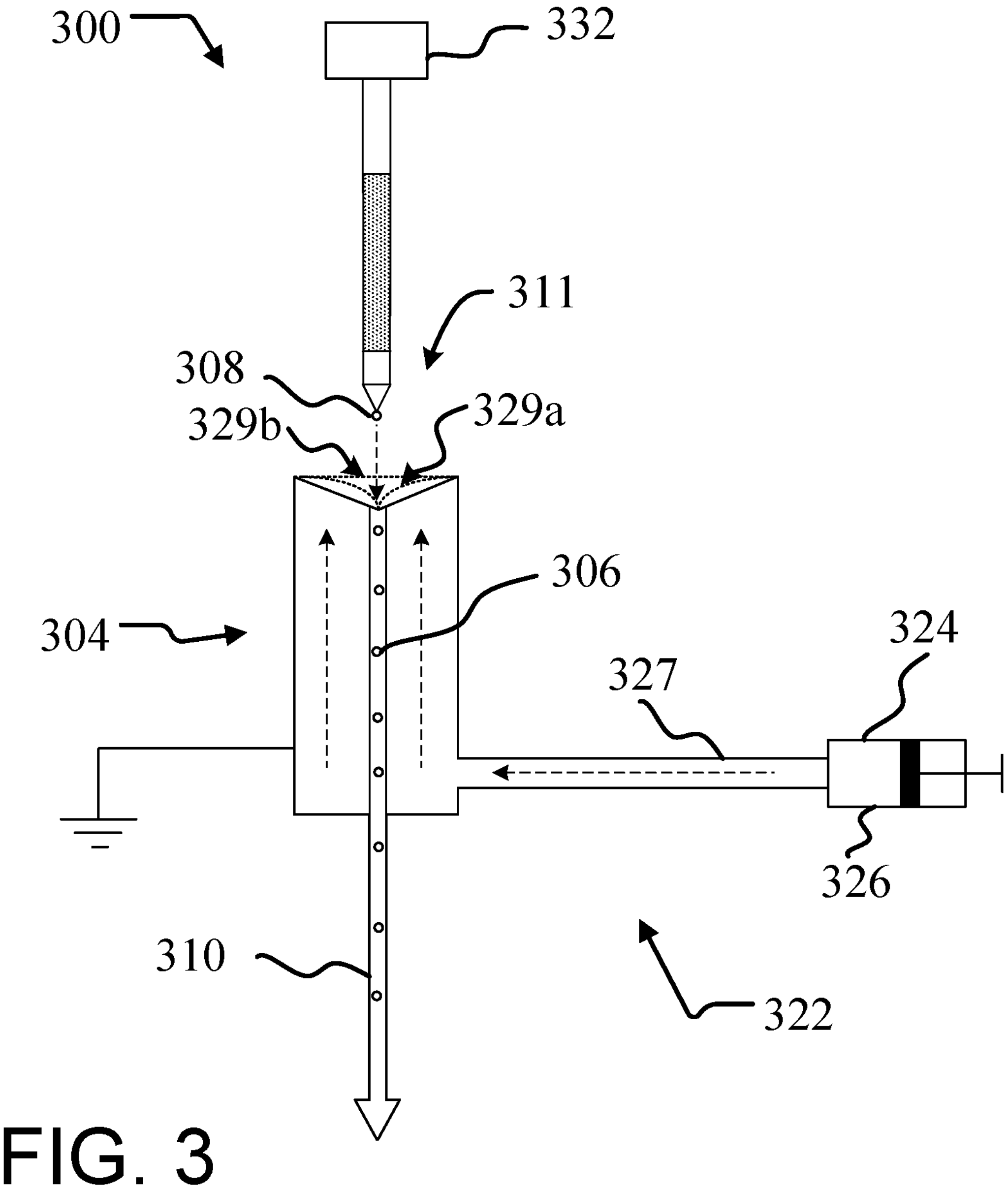
FIG. 3 depicts an enlarged partial view of an example system for receiving a sample droplet.

FIG. 3 depicts an enlarged partial view of an example system 300 for receiving a sample droplet 308. Although the OPI 304 is inverted compared to the example depicted in FIG. 1, the components utilized therein are consistent. Thus, the technologies described herein may be utilized in both the upright and inverted OPI 304 configurations, with samples 308 being introduced via gravity or pneumatically (as depicted in FIG. 3) or ejected upward (as depicted in FIG. 1). In general, the system 300 includes a transport liquid supply system 322 having a pump 324, a transport liquid source 326, and a transport liquid supply conduit 327. A sample removal conduit 310 is disposed within the OPI 304, substantially surrounded by the transport liquid supply conduit 327. A sample source (depicted generally at 332) may release the sample droplet 308 under gravity or pneumatically into the port inlet 311, where it meets the transport liquid flow, which is defined at least in part by a meniscus 329. During the flow condition where bubbles are generated, the meniscus cycles quickly between an open condition 329*a*, where gas from the surrounding atmosphere may be drawn into the sample removal conduit 310 to form bubbles 306, and a closed condition 329*b*, where the transport liquid completely covers the sample removal conduit 310 cutting off gas inflow. Alternatively, the meniscus 329 may extend into the entrance of the sample removal conduit 310 such that the bubbles are formed there. The diameter and geometry of the entrance may also determine the distortion of the meniscus 329 leading to the bubble separation at a uniform frequency. This regular cycling forms a plurality of bubbles 306 that are separated at regular intervals within the sample removal conduit 310, which is fluidically connected to the transport liquid conduit (not shown).

As noted above, generation of the bubbles may be a function of a number of factors, including the radius of the sample removal conduit or the transfer conduit, viscosity of the transport liquid and/or sample, aspiration pressure drop, flow rate of the transport liquid into the OPI, and, in some examples, length of the transport conduit. Bubbles may be generated at a frequency that may be timed relative to the frequency of sample introduction (e.g., ejection frequency). In examples, the flow rate of the transport fluid may be about 10 μL/min to about 5 mL/min. Lower flow rates are also contemplated, e.g., down to about 5 μL/min, or about 1 μL/min. Flow rates in excess of about 5 mL/min are also contemplated, e.g., about 10 mL/min, or about 15 mL/min. These flow rates may be balanced against an aspiration pressure drop generated at the ESI, which may be about 0.1 psi to about 14.7 psi. Other pressure drops, such as about 0.1 psi to about 10.0 psi, or about 1.0 psi to about 10.0 psi are also contemplated. At certain of these flow rates and pressures, bubble frequency may be in a range of about 0.1 Hz to about 10 kHz, about 1.0 Hz to about 5 kHz, or about 0.1 kHz to about 2.0 kHz. When introduced to the OPI, the sample may temporarily terminate bubble generation, as the volume of the sample droplet changes the flow condition within the OPI temporarily to a closed flow. This closed flow condition may last for about 1 msec to about 1000 msec, after which the excess volume of the sample droplet is drawn completely into the sample removal conduit and bubble generation resumes. In other examples, the volume of the sample droplet and frequency of the bubbles is such that the sample droplet will not interrupt bubble generation, so as to be simply drawn into the transport liquid between two adjacent bubbles. Alternatively, the sample aliquot will span multiple bubbles and will be separated into segments separated by the bubbles. The frequency of the bubbles splitting the aliquot may the same or different from the transport liquid flow only. The effect of the sample being introduced to the bubble stream of the OPI is depicted in FIGS. 4A-4F, below.

Figure 4B:
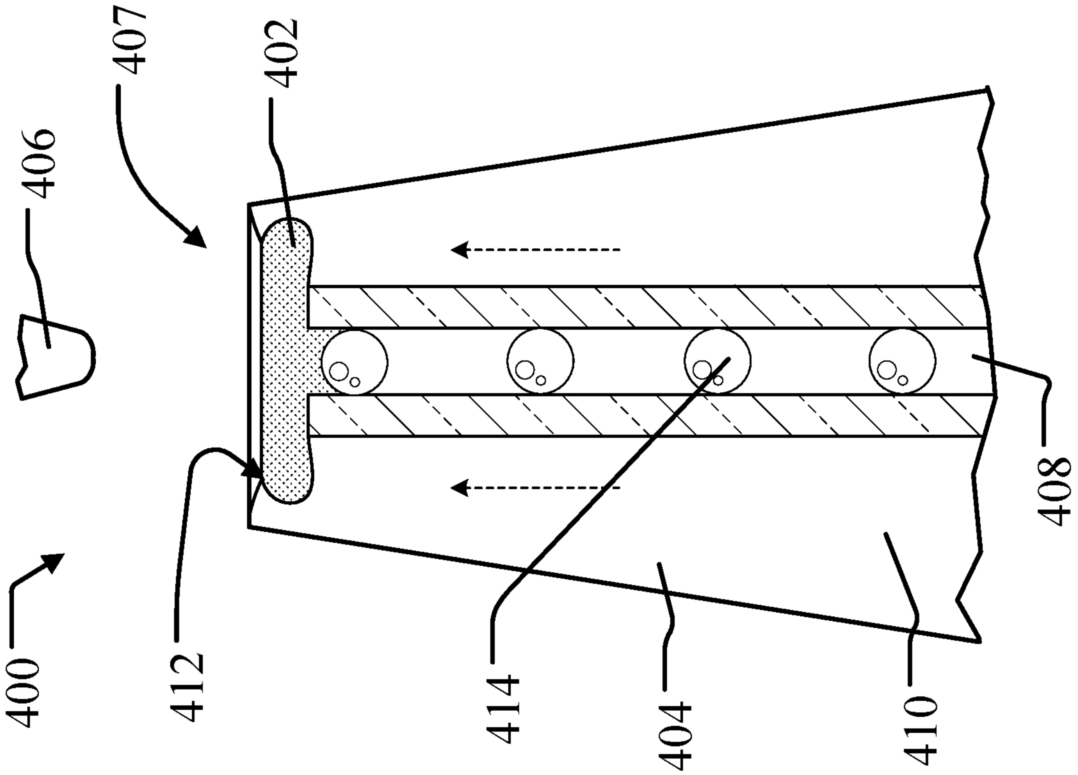
FIGS. 4A-4F depict partial cross-sectional views of a system depicting a sample droplet introduced to an OPI in a bubble flow condition.
Figure 4A:
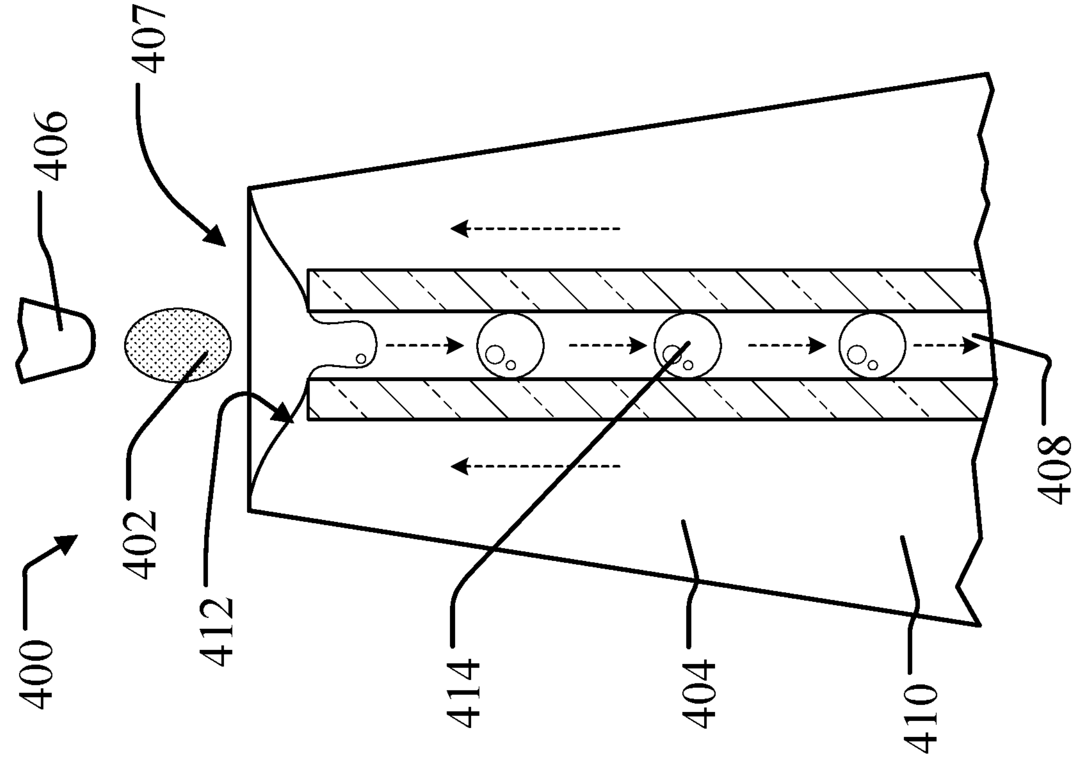
Figure 4D:
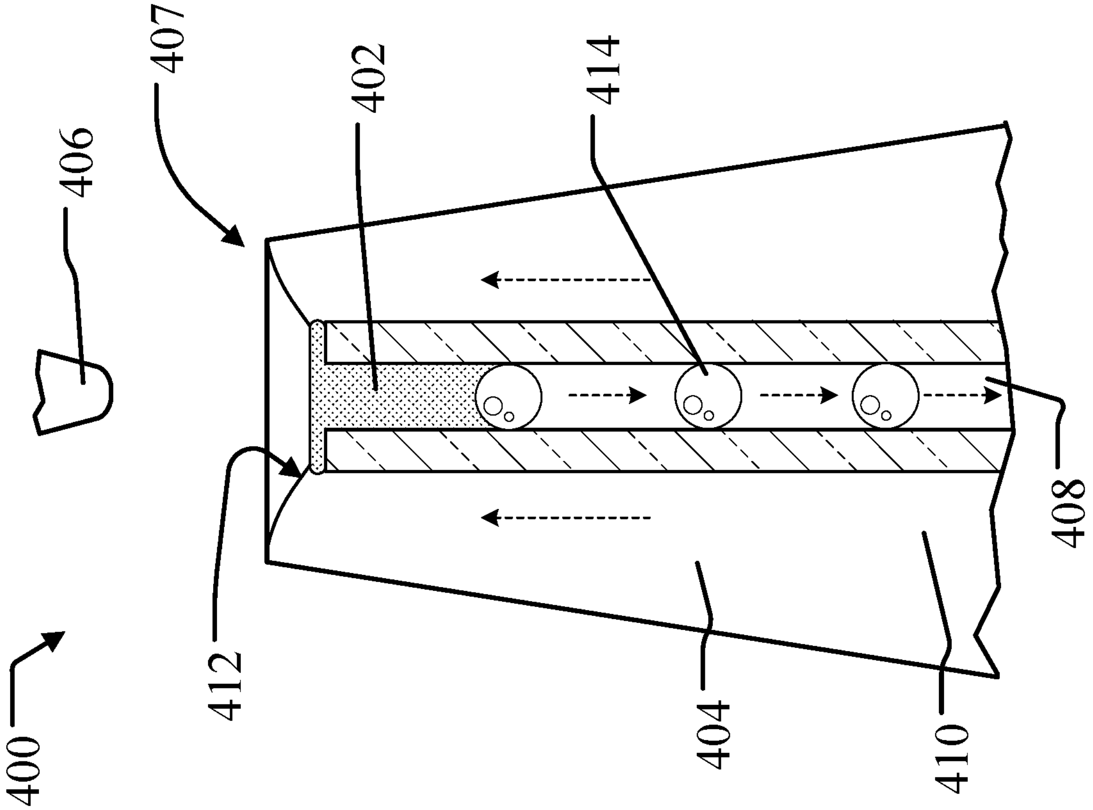
Figure 4C:
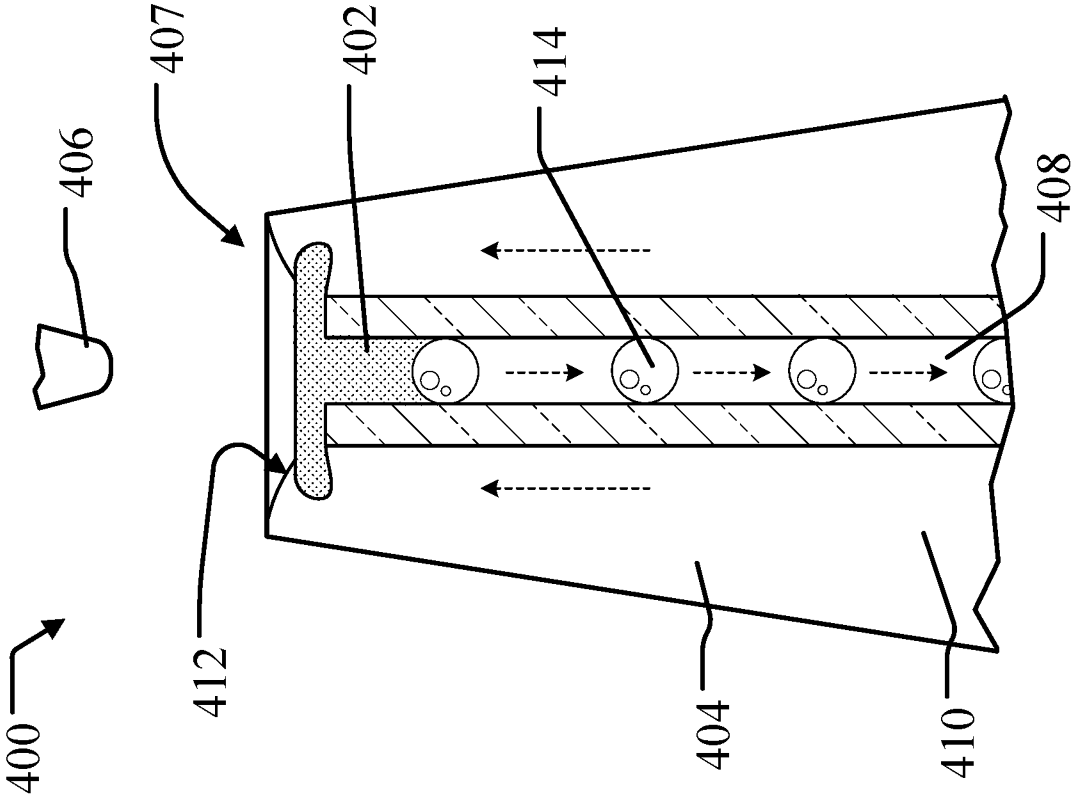
Figure 4F:
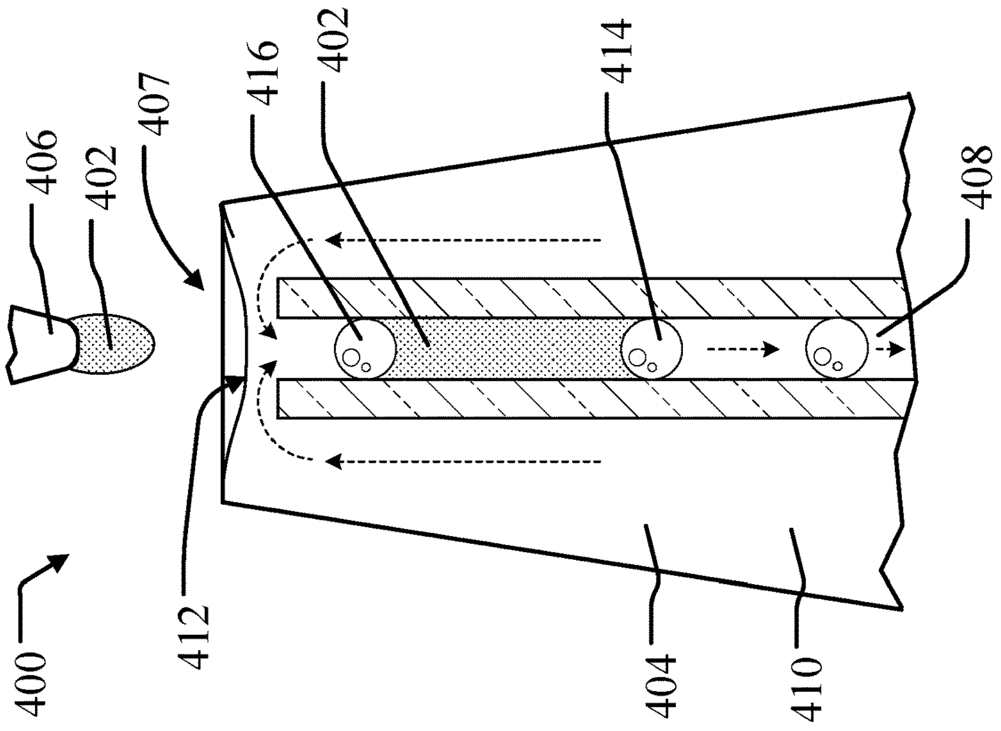
Figure 4E:
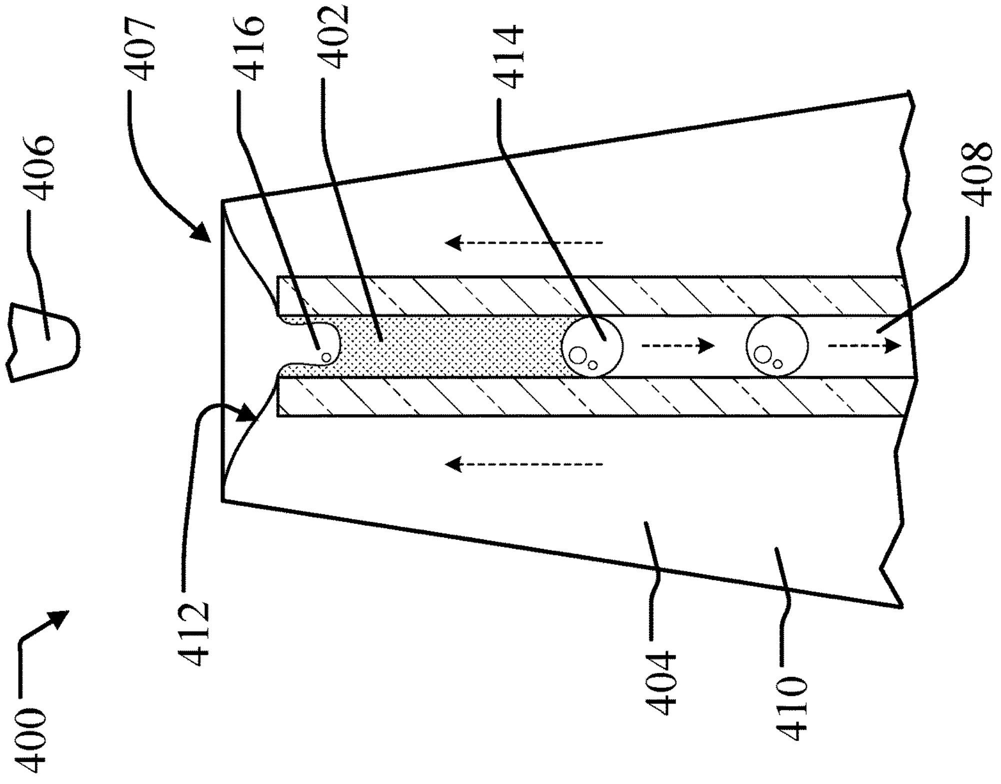

FIGS. 4A-4F depict partial cross-sectional views of a system 400 depicting a sample droplet 402 introduced to an OPI 404 in a bubble flow condition. The droplet 402 is released from a sample source 406 into the port inlet 407. In other examples, the droplet may be ejected (upwards) from a well plate (e.g., via contactless ejection). The OPI 404 includes a sample removal conduit 408 substantially surrounded by a transport liquid supply conduit 410. Transport liquid (depicted by dashed arrows) is delivered via the transport liquid supply conduit 410 and forms a meniscus 412. Thereafter, the transport liquid is aspirated into the sample removal conduit 408. The aspiration pressure draws the meniscus 412 into the sample removal conduit 408. At the appropriate balance between aspiration pressure drop and inflow liquid flow (defined in FIG. 4A by only the inflow transport liquid), the aspiration pressure forms first bubbles 414 at a first frequency within the transport liquid. Introduction of the sample droplet 402 terminates generation of the first bubbles, as the OPI 404 fills with the sample 402, as depicted in FIG. 4B. In this example, the term "first bubble(s)" describes one or more bubbles that precede or lead a particular sample droplet in the sample removal conduit 408. The term "second bubble(s)" will be used to describe one or more bubbles that follow the same sample droplet. The droplet 402 effects the inflow liquid flow (now defined by both the transport liquid and the droplet), thus causing the termination of first bubble generation, as the aspiration pressure drop draws both the transport liquid and droplet into the sample removal conduit 408 as an aliquot. This continues in FIGS. 4C-4D, as the first bubbles 414 and aliquot (droplet 402) are drawn deeper and deeper into the sample removal conduit 408. In FIGS. 4E-4F, the aliquot 402 has been drawn deeper into the sample removal conduit 408. Eventually, the sample droplet 402 has been drawn completely into the sample removal conduit 408, the aspiration pressure drop rebalances with the inflow liquid flow, and second bubbles 416 are formed within the transport liquid, as depicted in FIG. 4F. These bubbles 416 will continue to be generated at a steady frequency, until another sample droplet is introduced and the process repeats.

Figure 5:
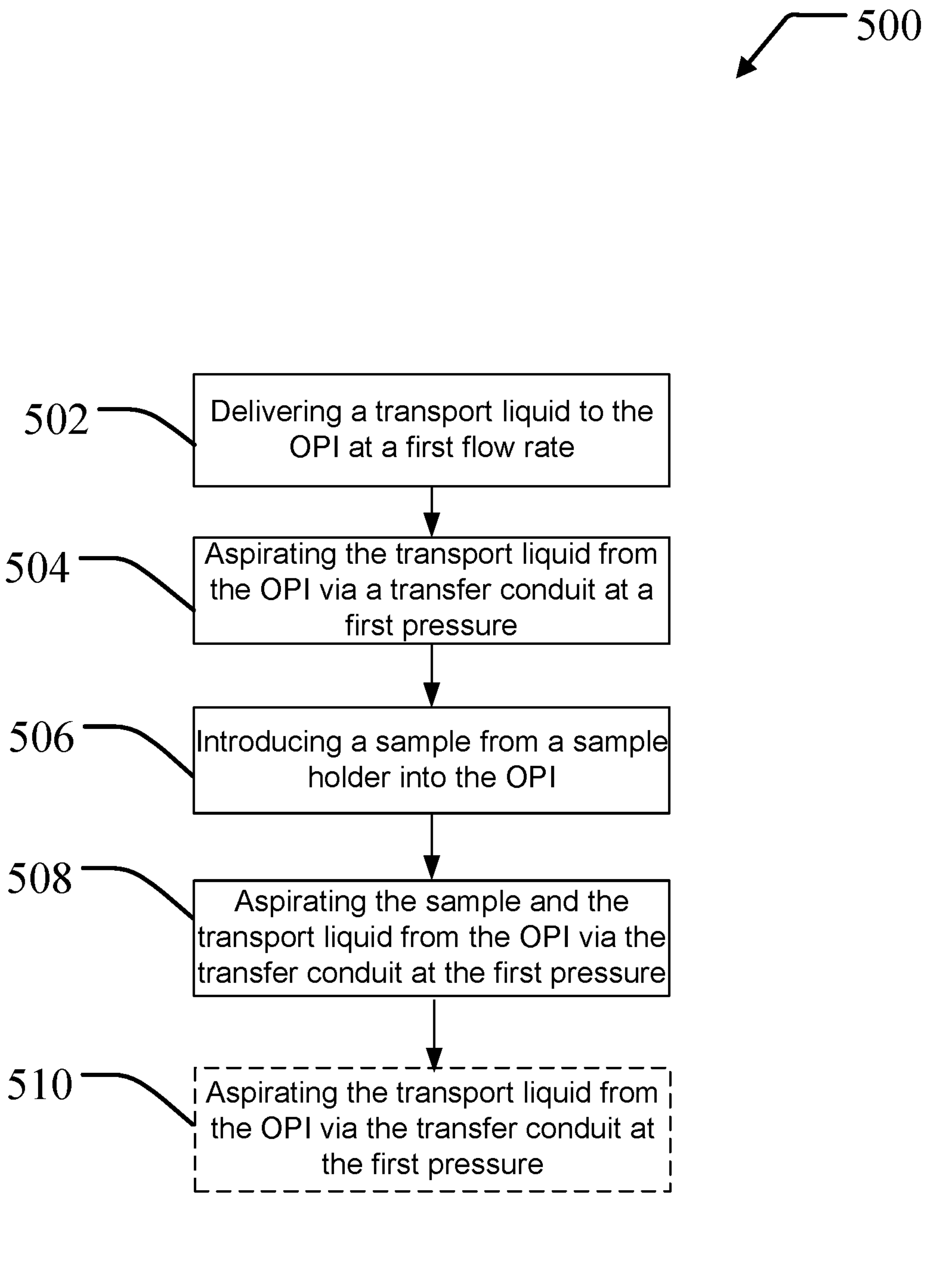
FIG. 5 depicts a method of separating samples received in an OPI.

A more detailed method 500 of separating samples received in an OPI consistent with the above FIGS. 4A-4F is depicted in FIG. 5. The method 500 begins with operation 502, delivering a transport liquid to the OPI at a first flow rate. Examples of desirable flow rates are describes elsewhere herein. The OPI is disposed in a gaseous atmosphere, such as a standard laboratory containing room air or an enclosed ion source with or without a bath gas and source exhaust. The method 500 continues to operation 504, aspirating the transport liquid from the OPI via a transfer conduit at a first pressure. Example pressures are described elsewhere herein. As depicted above, a sample removal conduit may form an inlet to the transfer conduit. This aspiration introduces a plurality of first bubbles containing gas from the surrounding atmosphere into the transport fluid and the sample removal conduit. The first bubbles are introduced into the sample removal conduit at a first frequency, which may be controlled based at least in part on the first flow rate and the aspiration pressure. Other factors may effect the first frequency, including but not limited to transport fluid viscosity, sample removal conduit diameter, sample removal conduit material, OPI port diameter, and other factors that are known to effect fluid flow. In operation 506, a sample droplet from a sample holder is introduced into the OPI. Depending on the volume of the sample droplet, this introduction temporarily terminates the generation of the plurality of first bubbles. In some examples, however, multiple droplets may be introduced to the OPI. This effectively increases the volume of fluid within that must be aspirated from the OPI, as described in further detail below. Thus, multiple droplets may be introduced, diluted, and mixed together in certain systems. This may be particularly useful in procedures such as high-throughput quantitation, sample preparation, or combinatorial chemistry. In such examples, the sample include a plurality of sub-samples, which may be multiple droplets ejected from a single well to increase the detection sensitivity, or from multiple wells of a well plate.

Operation 508 includes aspirating the sample droplet and the transport liquid in the OPI as an aliquot into the sample removal conduit and thereafter, the transfer conduit. The aspiration pressure drop may remain the same as the first pressure described in operation 504. In examples, two or more of operation 502-508 are performed substantially simultaneously, as is typical for sample droplet introduction into an OPI. This aspiration of the sample droplet and the transport liquid continues until the sample is aspirated entirely into the sample removal conduit. Upon meeting this condition, a dilution of both the sample droplet and the transport liquid are bounded on a leading end by one of the plurality of first bubbles and on a trailing end by one of a plurality of second bubbles, which are generated in a manner similar to that of the first bubbles. The time between the termination of the generation of the first bubbles and the generation of the second bubbles may be between about 1 msec to about 1000 msec. In other examples, time delays of about 5 msec to about 100 msec, or about 5 msec to about 500 msec are contemplated. Once the sample droplet is drawn into the OPI, aspirating the transport liquid from the OPI via the sample removal conduit and the transfer conduit at the first pressure continues, operation 510. Continued aspiration is what ultimately introduces the plurality of second bubbles into the transport fluid. As with the plurality of first bubbles, the plurality of second bubbles are introduced from the atmosphere and into the transfer conduit. In examples, the plurality of second bubbles are generated at a second frequency, which may be the same or different than the first frequency of the first bubbles, as described above.

Figure 6:
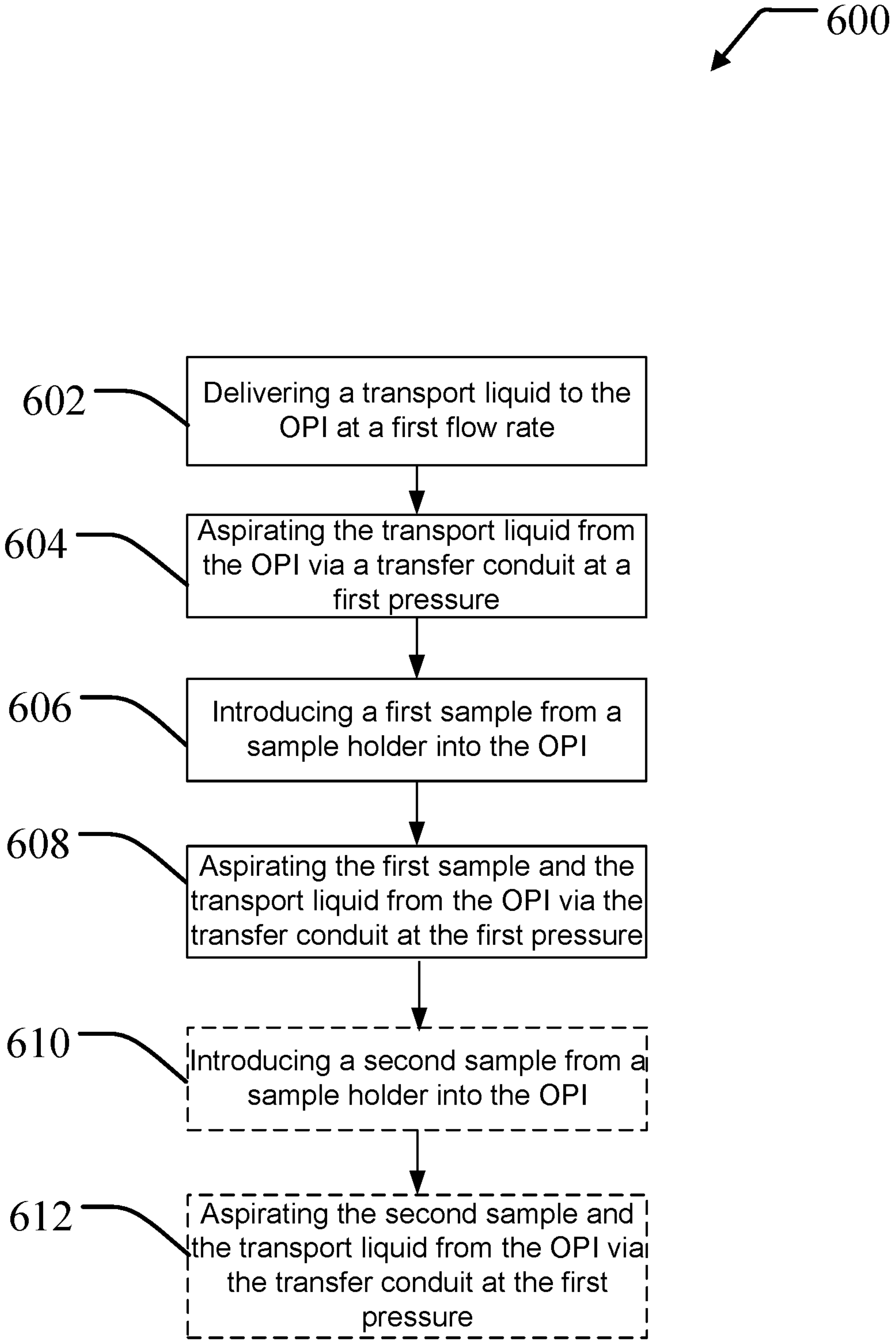
FIG. 6 depicts another method of separating samples received in an OPI.

The aspiration pressure drop, inflow rate of the transport liquid, sample droplet introduction rate, sample droplet volume, etc., may also be balanced such that a single bubble separates a first sample droplet from a second sample droplet. Such a method is a modification of the method 500 of FIG. 5 and is depicted as method 600 in FIG. 6. The method 600 begins with operation 602, delivering a transport liquid to the OPI at a first flow rate. As described above, the OPI is disposed in an atmosphere. The method 600 continues with operation 604, aspirating the transport liquid from the OPI via a transfer conduit at a first pressure. This generates a plurality of bubbles (comprised of gas from the atmosphere) in the transport fluid, which are drawn into the sample removal conduit and subsequently, the transfer conduit, a first frequency. In operation 606, a first sample is introduced from a sample holder into the OPI. Operation 608 includes aspirating the first sample and the transport liquid from the OPI via the sample removal conduit and the transfer conduit at the first pressure. This first sample and at least a portion of the transport liquid form a first aliquot that is bounded on a leading end by a first one of the plurality of bubbles and on a trailing end by a second one of the plurality of bubbles. In other words, the method 600 contemplates a condition where the various inputs noted above are balanced such that introduction of a sample droplet does not alter the frequency of the bubbles generated in the transport liquid. The method 600 may continue with operation 610, introducing a second sample from the sample holder into the OPI. Thereafter, operation 612 may be performed, aspirating the second sample droplet and the transport liquid from the OPI via the transfer conduit at the first pressure. Since the various conditions are balanced, the second sample droplet and at least a portion of the transport liquid form a second aliquot that is bounded on a leading end by the second one of the plurality of bubbles and on a trailing end by a third one of the plurality of bubbles. This process may continue with subsequent sample droplet introductions being separated from a previously introduced sample by a single bubble, with each bubble separating the samples generated or introduced at a uniform frequency. Thus, in this method 600, each sample is separated by a single bubble, making the first bubble followed by the first sample, which is followed by the second bubble, which is followed by the second sample, which is followed by the third bubble, and so on. If required or desired, the various conditions may be further altered to separate sample aliquots from each other by two, three, or more bubbles, consistent with the methods generally described herein.

Figure 7:
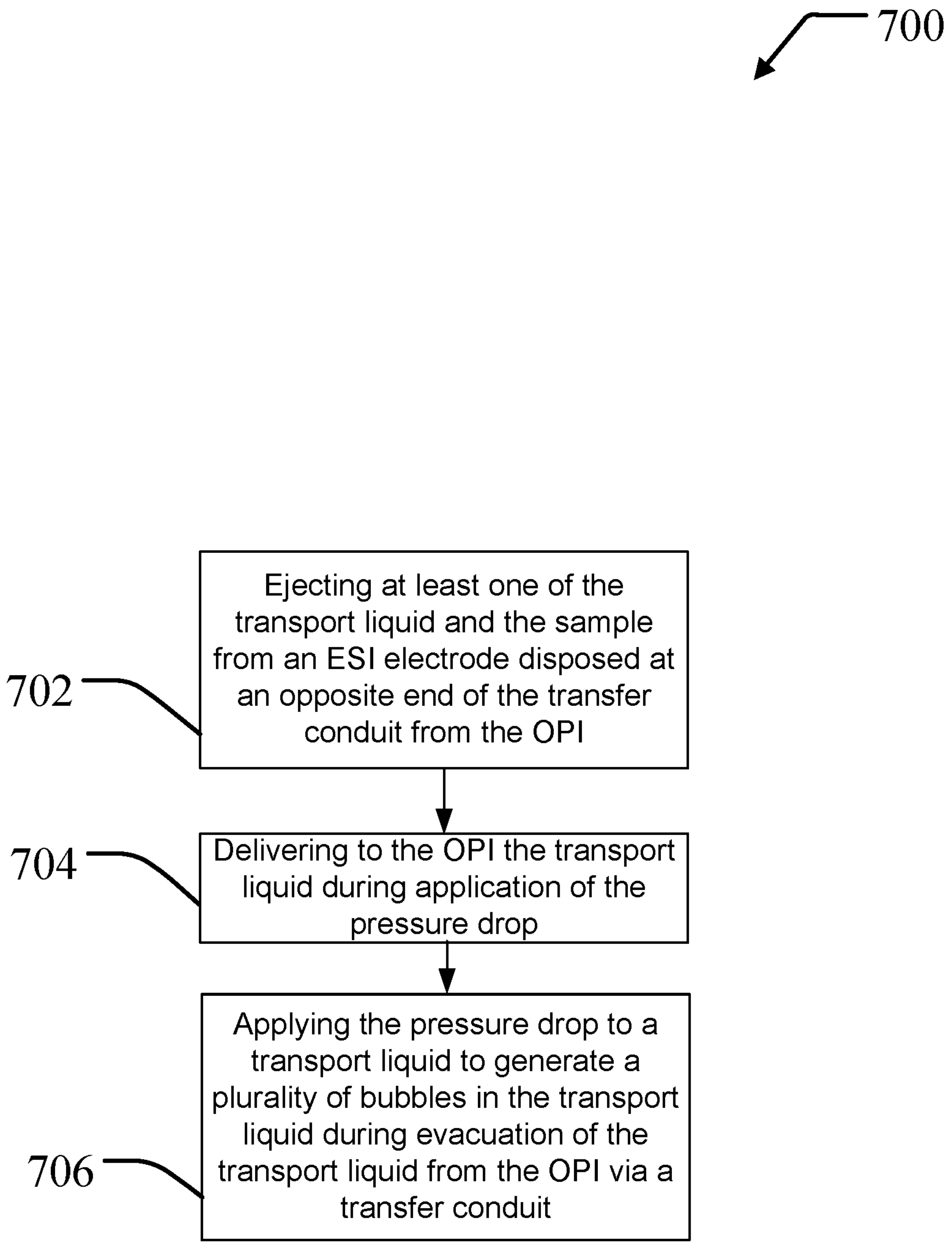
FIG. 7 depicts a method of evacuating a sample from an OPI.

FIG. 7 depicts a method 700 of evacuating a sample from an OPI with an aspiration pressure drop. The OPI is connected to an ESI electrode with a transfer conduit. In examples, the ESI electrode is a nebulizer-assisted ESI electrode. The method 700 begins with ejecting at least one of a transport liquid and the sample from the ESI electrode. If a sample has not yet been introduced to the OPI (e.g., at the start of the method 700), only the transport liquid will be introduced. The pressure drop is generated at the ESI by a nebulizer gas expanding past an opposite end of the transfer conduit. Substantially simultaneously with operation 702, operation 704, delivering to the OPI the transport liquid, is performed. The method continues with operation 706, applying the pressure drop to the transport liquid to generate a plurality of bubbles in the transport liquid during evacuation of the transport liquid from the OPI. Once liquid samples are introduced to the OPI, each of the liquid samples are separated by at least one bubble. In another example, however, a single sample droplet may be of a volume that does not interfere with the frequency at which the plurality of bubbles are generated. As such, a single sample droplet may be separated into a first portion on one side (e.g., a leading side) of a particular bubble, and a second portion on a second side (e.g., a trailing side) of that same bubble, without changing the frequency of bubble generation. The pressure drop generates a flow rate of transport liquid through the transfer conduit corresponding to about 50% to about 90% of a flow rate based on the Hagen-Poiseuille equation. In other examples, the flow rate may be no less than about 50% of a flow rate based on the Hagen-Poiseuille equation, or no greater than about 90% of a flow rate based on the Hagen-Poiseuille equation.

Figure 8:
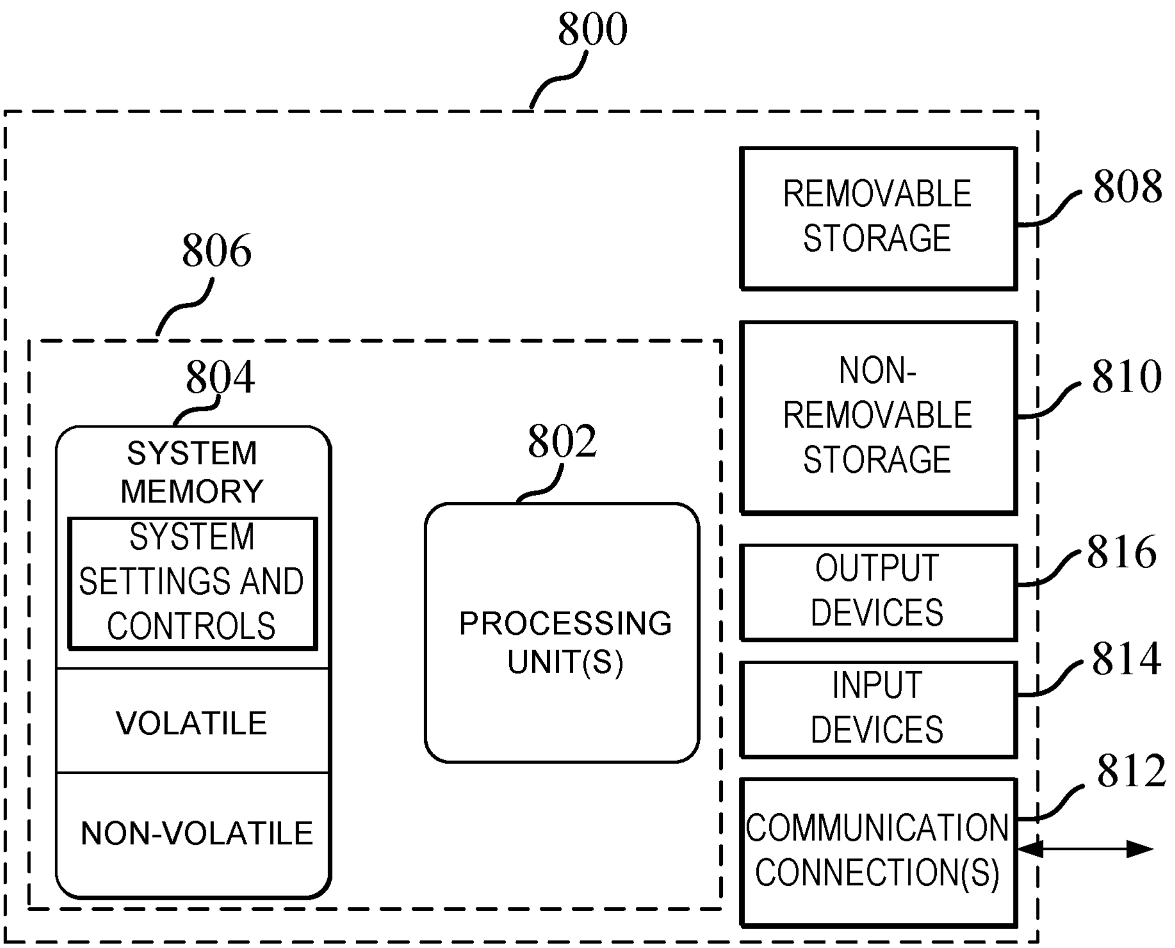
FIG. 8 depicts an example of a suitable operating environment in which one or more of the present examples can be implemented.

FIG. 8 depicts one example of a suitable operating environment 800 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, instructions to control the eject the samples, adjust an aspiration pressure or inflow flow rate, or perform other methods disclosed herein) can be volatile (such as RAM), non-volatile (such as ROM, flash memory, etc.), or some combination of the two. This most basic configuration is illustrated in FIG. 8 by dashed line 806. Further, environment 800 can also include storage devices (removable, 808, and/or non-removable, 810) including, but not limited to, magnetic or optical disks or tape. Similarly, environment 800 can also have input device(s) 814 such as touch screens, keyboard, mouse, pen, voice input, etc., and/or output device(s) 816 such as a display, speakers, printer, etc. Also included in the environment can be one or more communication connections 812, such as LAN, WAN, point to point, Bluetooth, RF, etc.

Operating environment 800 typically includes at least some form of computer readable media. Computer readable media can be any available media that can be accessed by processing unit 802 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 800 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 800 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 800 is part of a network that stores data in remote storage media for use by the computer system 800.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of separating samples received in an open port interface (OPI), the method comprising:

delivering a transport liquid to the OPI at a first flow rate, wherein the OPI is disposed in an atmosphere;

aspirating the transport liquid from the OPI via a transfer conduit at a first pressure, so as to introduce a plurality of first bubbles into the transport fluid, wherein the plurality of first bubbles are introduced from the atmosphere and into the transfer conduit, wherein the plurality of first bubbles are generated at a first frequency;

introducing a sample from a sample holder into the OPI, wherein the introduction of the sample terminates the generation of the plurality of first bubbles; and aspirating the sample and the transport liquid from the OPI via the transfer conduit at the first pressure, wherein the sample and at least a portion of the transport liquid are bounded on a leading end by one of the plurality of first bubbles and on a trailing end by one of a plurality of second bubbles.

2. The method of claim 1, further comprising, subsequent to aspirating the sample and the transport liquid from the OPI, aspirating the transport liquid from the OPI via the transfer conduit at the first pressure, so as to introduce the plurality of second bubbles into the transport fluid, wherein the plurality of second bubbles are introduced from the atmosphere and into the transfer conduit, wherein the plurality of second bubbles are generated at a second frequency.

3. The method of claim 2, wherein the second frequency is equal to the first frequency.

4. The method of claim 1, wherein the first flow rate comprises a range of about 10 uL/min to about 5 mL/min.

5. The method of claim 1, wherein the first pressure comprises a range of about 0.1 psi to about 14.7 psi.

6. The method of claim 1, wherein the first frequency comprises a range of about 0.1 Hz to about 10 kHz.

7. The method of claim 1, wherein delivering the transport liquid to the OPI at the first flow rate, aspirating the transport liquid from the OPI via the transfer conduit at the first pressure, and introducing the sample from the sample holder into the OPI are performed substantially simultaneously.

8. The method of claim 1, wherein delivering the transport liquid to the OPI at the first flow rate, introducing the sample from the sample holder into the OPI, and aspirating the sample and the transport liquid from the OPI via the transfer conduit at the first pressure are performed substantially simultaneously.

9. The method of claim 1, wherein the sample comprises a plurality of sub-samples.

10. A method of evacuating a liquid sample from an open port interface (OPI) with a pressure drop, the method comprising applying the pressure drop to a transport liquid to generate a plurality of bubbles in the transport liquid during evacuation of the transport liquid from the OPI via a transfer conduit, wherein the liquid sample is separated from a subsequent liquid sample by at least one bubble.

11. The method of claim 10, further comprising generating the pressure drop by ejecting at least one of the transport liquid and the sample from an electrospray ionization (ESI) electrode disposed at an opposite end of the transfer conduit from the OPI.

12. The method of claim 10, further comprising delivering to the OPI the transport liquid during application of the pressure drop.

13. The method of claim 10, wherein applying the pressure drop to the transport liquid generates a flow rate of transport liquid through the transfer conduit corresponding to about 50% to about 90% of a flow rate based on the Hagen-Poiseuille equation.

14. The method of claim 10, wherein applying the pressure drop to the transport liquid generates a flow rate of transport liquid through the transfer conduit of no less than about 50% of a flow rate based on the Hagen-Poiseuille equation.

15. The method of claim 10, wherein applying the pressure drop to the transport liquid generates a flow rate of transport liquid through the transfer conduit of no greater than about 90% of a flow rate based on the Hagen-Poiseuille equation.

16. The method of claim 11, where the ESI electrode comprises a nebulizer-assisted ESI electrode, and the pressure drop is generated by a nebulizer gas expanding past an opposite end of the transfer conduit.

17. The method of claim 11, wherein the liquid sample comprises a first portion on a first side of a first bubble of the plurality of bubbles and a second portion on a second side of the plurality of bubbles.

18. A method of separating samples received in an open port interface (OPI), the method comprising:

delivering a transport liquid to the OPI at a first flow rate, wherein the OPI is disposed in an atmosphere;

aspirating the transport liquid from the OPI via a transfer conduit at a first pressure, so as to generate a plurality of bubbles in the transport fluid, wherein the plurality of bubbles are introduced from the atmosphere and into the transfer conduit, wherein the plurality of bubbles are generated at a first frequency;

introducing a first sample from a sample holder into the OPI; and aspirating the first sample and the transport liquid from the OPI via the transfer conduit at the first pressure, wherein the first sample and at least a portion of the transport liquid form a first aliquot bounded on a leading end by a first one of the plurality of bubbles and on a trailing end by a second one of the plurality of bubbles.

19. The method of claim 18, further comprising:

introducing a second sample from the sample holder into the OPI; and aspirating the second sample and the transport liquid from the OPI via the transfer conduit at the first pressure, wherein the second sample and at least a portion of the transport liquid form a second aliquot bounded on a leading end by the second one of the plurality of bubbles and on a trailing end by a third one of the plurality of bubbles.

20. The method of claim 18, wherein each bubble of the plurality of bubbles are separated at a uniform frequency.

* * * * *